United States Patent
Horakova et al.

[19]

[11] Patent Number: 6,059,963
[45] Date of Patent: May 9, 2000

[54] FAT AND OIL REMOVAL INSTALLATION

[75] Inventors: Dana Horakova; Rudolf Horak, both of Brno; Miroslav Nemec, Ceska, all of Czechoslovakia

[73] Assignee: Biorem AG, Baar, Switzerland

[21] Appl. No.: 09/077,981

[22] PCT Filed: Dec. 19, 1996

[86] PCT No.: PCT/CH96/00451

§ 371 Date: Jun. 11, 1998

§ 102(e) Date: Jun. 11, 1998

[87] PCT Pub. No.: WO97/22560

PCT Pub. Date: Jun. 26, 1997

[30] Foreign Application Priority Data

Dec. 19, 1995 [DE] Germany ................... 195 47 400

[51] Int. Cl.$^7$ ............... B01D 21/30; B01D 17/12; C02F 3/34

[52] U.S. Cl. ............... 210/143; 210/150; 210/151; 210/128.1; 210/220; 210/262; 210/519; 210/521; 210/611; 210/614; 210/632; 435/255.1; 435/255.7

[58] Field of Search ............... 210/97, 101, 109, 210/110, 139, 143, 150, 151, 198.1, 202, 205, 209, 259, 294, 295, 739, 606, 610, 614, 619, 621, 631, 632, 136, 611, 188, 194, 195.1, 220, 262, 519, 521, 533, 534; 435/255.1, 255.7, 262

[56] References Cited

U.S. PATENT DOCUMENTS

| | | | |
|---|---|---|---|
| 4,755,296 | 7/1988 | Ying et al. | 210/631 |
| 5,126,050 | 6/1992 | Irvine et al. | 210/631 |
| 5,240,597 | 8/1993 | Ueda | 210/151 |
| 5,240,600 | 8/1993 | Wang et al. | 210/631 |
| 5,354,458 | 10/1994 | Wang et al. | 210/205 |
| 5,567,314 | 10/1996 | Chigusa et al. | 210/150 |

FOREIGN PATENT DOCUMENTS

| | | | |
|---|---|---|---|
| 0546881 | 6/1993 | European Pat. Off. . | |
| 1658068 | 11/1971 | Germany . | |
| 3-278897 | 12/1991 | Japan | 210/606 |
| 7-075795 | 3/1995 | Japan . | |
| 8-182995 | 7/1996 | Japan . | |
| 9638389 | 12/1996 | WIPO . | |

*Primary Examiner*—Joseph W. Drodge
*Attorney, Agent, or Firm*—Edwin D. Schindler

[57] ABSTRACT

An installation for the simultaneous separation and removal of fats and oils in waste water, which includes a treatment container chamber for receiving a liquid medium. Out of the treatment container chamber, through a bottom outlet, is an overflow pipe running upwards and which opens outwardly outside of the treatment container chamber as a discharge pipe, so that its inside bottom edge, at the point where it opens outwardly, defines a level of a medium in the treatment container chamber. A support material in the form of a plurality of plastic tubes is wound with lengths of polyester cord colonized with a fat and oil-degrading yeast microorganism *Yarrowia lipolytica* W1 in the treatment container chamber. A nutrient solution container, with a metering pump for feeding $NH_{4+}$ into the treatment container chamber, as required, is included as a source of nitrogen for the fat and oil-degrading microorganism, along with a device for supplying the microorganisms with air. Finally, a metering device having a programmable control device, for metering previously separated fat and oil from either a waste water container chamber arranged outside the treatment container chamber and belonging to the overall installation for removing fat and oil, or from a separate fat-separator, to said treatment container chamber, is included.

9 Claims, 5 Drawing Sheets

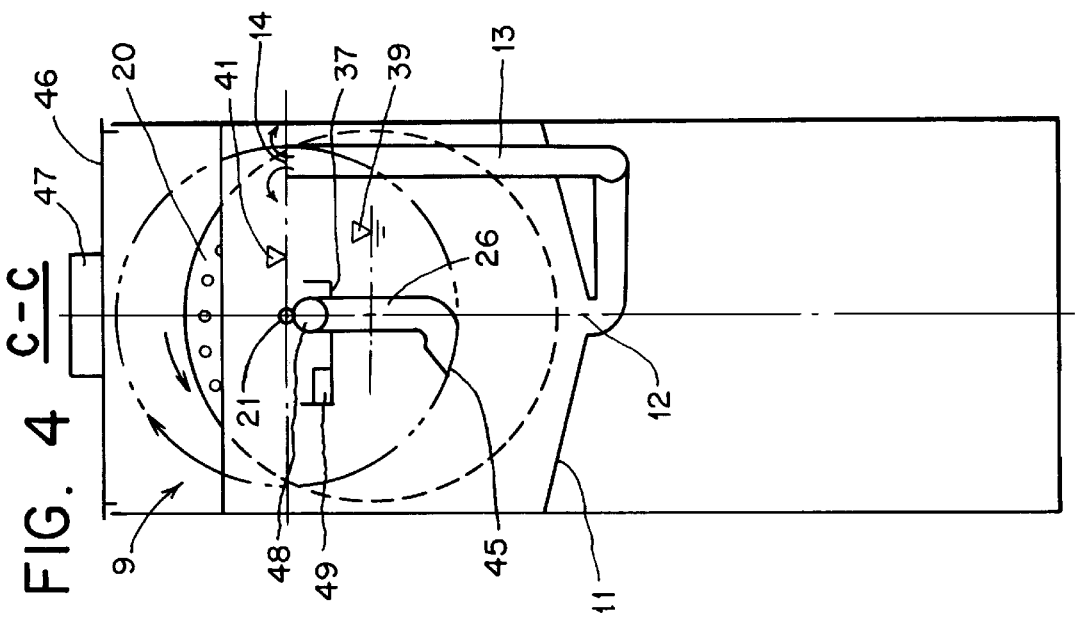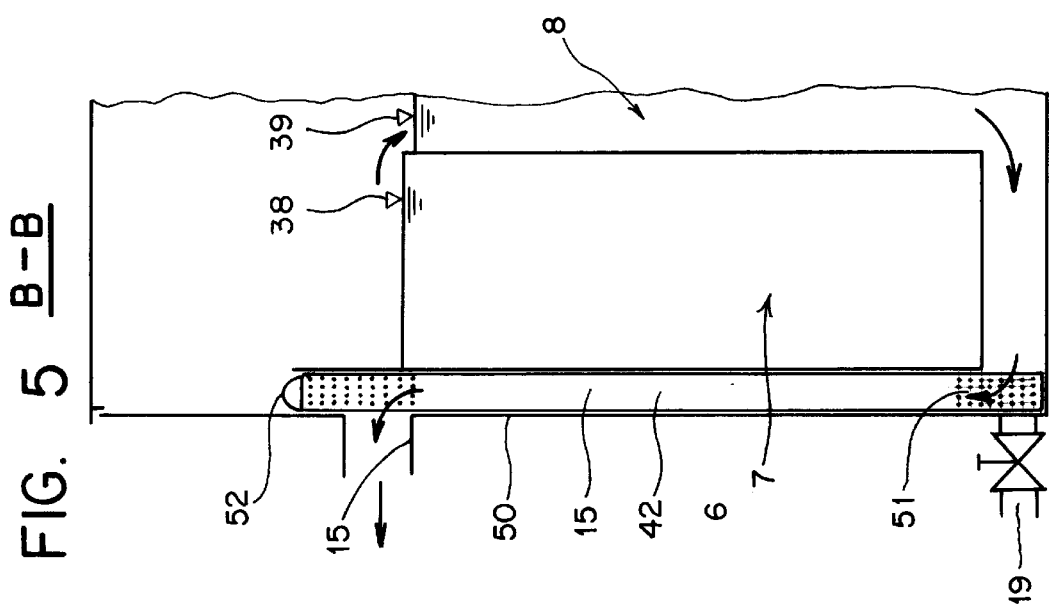

FAT AND OIL REMOVAL INSTALLATION

BACKGROUND OF THE INVENTION

This invention relates in general to an installation for removing fats and oils, for which purpose fat and oil-degrading micro-organisms are used in particular. The installation can, in particular, be designed to simultaneously separate and remove fats and oils in waste water. The fats and oils in question may be of different types such as e.g. mineral, synthetic or organic. Of particular interest here are the type of organic fats and oils that occur in waste water from hotels, restaurants and other industrial kitchens above all. The installation can, however, also be designed for the waste water from food-processing operations of all kinds such as, for example, slaughterhouses and butchers shops.

Many local authorities impose discharge regulations on commercial users of the local sewage system in order to protect their waste water purification plants and to prevent drainage pipes from clogging up. In Germany, for example, the maximum volume of organic fats and oils which such commercial operations are permitted to discharge per liter of waste water fluctuates depending on the local authority between 50 mg and 250 mg, with a limit of 50 mg now increasingly being prescribed. This is why such businesses install fat-separating plants. In urban areas, one fat-separating plant of this type is usually operated for about every 500 residents.

Conventional fat-separating plants, which are designed to separate fats and oils from water solely by means of gravity, are associated with a series of problems. Firstly, under the greatly fluctuating operating conditions that prevail in practice, the actual fat-separating capacity of the installations is often lower than what is required to comply with the statutory limits. When determining the total content of organic oils and fats as polar lipophile substances, it is often forgotten that, because of the way fat-separators function, they can only hold back those parts of the lipophile substances that are separable. They are not capable of holding back the emulsified, dissolved and dispersed fat that occurs because of the detergents that are used and the high temperature of the waste water from dishwasher systems. This fat occurs in a similar kind of state as the fat in milk, which contains fat particles with a diameter of only 0.1 $\mu$m to 10 $\mu$m, which do not float to the top.

Furthermore, a conventional fat-separator has to be emptied and cleaned every two to four weeks, an intervention for which the operator of the installation is responsible. Fat-separators in butchers shops have to be cleaned at least once a week or, at the latest, when the fat storage container is full. As a general rule, fat-separators in industrial kitchens have to be emptied every two weeks. But the volume and quality of the waste water fluctuate even amongst industrial kitchens which prepare the same number of meals. Tests have shown that, because of differences in the types of foods and in the method of preparation, the fat content in the waste water from a hospital kitchen producing 1,000 meals per day is approx. 500 mg/l on average, for example, whilst the fat content in the waste water from an army kitchen is approx. 1,500 mg/l, i.e. three times more. The fat content per meal can range from 3 to 30 g. Depending on the type of kitchen, the fat-separators have to be drained more or less frequently. Regular draining of the fat-separator involves opening the latter and introducing a suction pipe leading from a waste disposal vehicle. The nauseous smell that occurs as the fat is sucked off causes a very unpleasant odour in the immediate vicinity of the installation. After the installation has been drained, it is cleaned with superheated steam. This essential maintenance work causes inconvenience as well as considerable recurrent costs. To reduce the volumes that have to be transported away, prior art fat-separating systems exist in which the separated fat is pressed into separate containers so that only the material actually separated off has to be transported away for disposal or recycling. Regular and expensive transport is still required, however, and this is an additional burden on the environment.

SUMMARY OF THE INVENTION

Hence it is the task in general of this invention to provide an installation for removing fats and oils of whatever origin, which saves all, or part, of the related costs.

In particular, it is a task of this invention to provide an installation for the separation and subsequent removal of fats and oils in waste water which renders it unnecessary to regularly transport away the content of the fat-separator or the separated fat, thereby saving the related costs, and, furthermore, which eliminates the nuisance from smells generated by a conventional fat-separator.

In one particular embodiment, another task of the installation for separating and subsequently removing fats and oils in waste water is to achieve improved retention of the fats and oils in the waste water so as to obtain lower limit values of lipophile substances in the discharged waste water.

The general task is solved by an installation for removing fats and oils characterized by the features of claim 1.

The specific task of providing an installation for the separation and subsequent removal of fats and oils in waste water is solved by an installation with the features of the dependent claim 2.

The additional task of improving the retention of fats and oils in waste water is solved by an installation with the characterizing features of the dependent claim 7.

BRIEF DESCRIPTION OF THE DRAWINGS

The drawings show both an installation for the mere removal of fats and oils, as well as a specific installation for separating and subsequently removing fats and oils in waste water. These installations, and the way in which they function, will be described below in detail with reference to these exemplary embodiments.

The drawings show:

FIG. 4: a diagrammatic representation of the installation of FIG. 2, seen from the left, in a section along the plane C—C in FIG. 2;

FIG. 5: a diagrammatic representation of the installation of FIG. 2, seen from the side, in a section along the plane B—B in FIG. 2.

DETAILED DESCRIPTION OF THE INVENTION

The installation for removing fats and oils can be designed as an addition to an existing fat-separating system, in order to continuously remove the fat separated in the latter, or as a separate installation for operating a central disposal unit for waste fats and oils in which large volumes of separated fat from regularly drained fat-separators can be treated. The heart of the installation is a container chamber with a liquid medium in it, in which there is a microbiological module comprising a carrier substance which is colonized with fat and oil-degrading micro-organisms, with a metering device enabling fat and oil to be metered to this container chamber and hence to the micro-organisms in it. The micro-organisms than degrade the fat and oil, thereby lowering the pH-value of the liquid medium in the container chamber. During this process it is important that the peripheral conditions for ensuring the high activity of the micro-organisms are maintained. In addition to metering in fat and oil, the micro-organisms are also supplied with air and nutrient solution as necessary.

Figure 1:
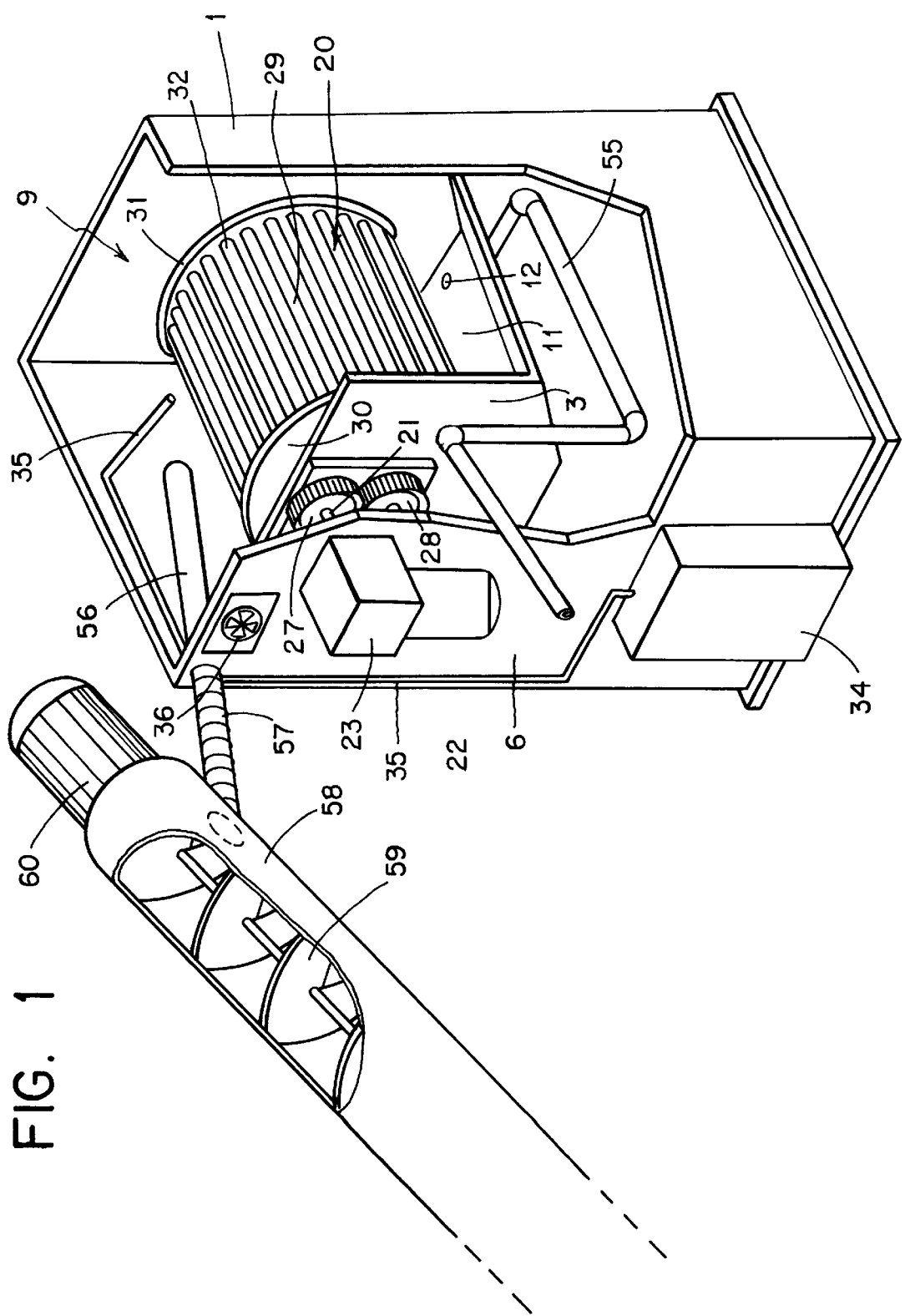
FIG. 1: a perspective view of a partial section of an installation for removing fats and oils.

An installation such as this for removing fats and oils consists, as shown here by way of example in FIG. 1, of a square container 1. This can be made from chromium steel or plastic, with polypropylene being especially suitable because it resists fatty acids and is not affected by low pH-values either. Hence no long-term problems with corrosion are likely. Inside container 1, separated by partition 3, there is a container chamber 9, which contains the microbiological module in the form of a drum 20, and which, when in operation, is filled up to the drum axle with a liquid medium. The bottom of this container chamber 9 forms a channel 11 that slopes downwards and towards the back. At the back of this channel 11, container 9 has an outlet (12). This feeds into an overflow pipe 55 which runs out of container 1 with its inside bottom edge defining, at the point when it opens out, the level of the medium in container chamber 9. On side 6 of container 1 there is an electric motor 22 with angle gear 23, whose drive shaft 21 rotates drum 20 via two toothed gears 27,28 disposed one on top of the other. The liquid level in container chamber 9 comes up to the axle of the lower gear 28. This ensures that the drum bearings are lubricated and that container 1 always remains sealed because drive shaft 21 runs through container wall 6 above the level of the liquid. The drum 20 has a drum disc 30,31 at both ends, and these drum discs are connected around their periphery with plastic tubes 32 or round plastic bars to form a cage-drum 20. The inside of this drum can be sub-divided into sections by other plastic rods. When the installation is operated, this drum is filled with carrier materials for fat and oil-degrading micro-organisms. The carrier materials, with the micro-organisms colonized on them, are alternately rotated with drum 20 through the fat-polluted water and medium, which comes up to about the middle of drum shaft 29, and then through the air above this level. As they do so, they absorb oil and fat, which are then degraded by the micro-organisms as described below. Built into side wall 6 there is a ventilator 36 with a one-way valve which allows air to be blown into the container because the micro-organisms used are aerobic, and need a supply of air. Inside container 1, the exhaust air is blown outside through a hole in the top of overflow pipe 55 at its highest point, or through a special odour filter not shown here. In the example shown, the metering device for the fat and oil is designed as follows: attached to container 1 there is an inlet pipe 56 made from acid-resistant plastic for metering in the oil and fat to be degraded, which runs slopingly into the container and opens out above container chamber 9.

The plastic pipe 57 running from container wall 6 is of a flexible design and is connected to the underside of a plastic pipe 58 with a bigger diameter, inside which there is an Archimedes screw 59 which has a chromium steel shaft and is otherwise also made from acid-resistant plastic. This shaft is driven by a separate motor 60 which can be disposed as shown here, for example, at the top end of pipe 58. The bottom end of pipe 58 can now be odourtightly immersed into an existing fat-separating installation, with its bottom aperture being positioned just below the level of liquid in the fat-separating installation. Pipe 58 is held in place with an appropriate retaining device not shown here. Motor 60 can now be switched on as required, whereupon the Archimedes screw 59 conveys oil and fat up pipe 58 and into container chamber 9 via pipe 57,56, where it is removed by the microbiological module. The resultant metabolic products are conducted out of container 1 and back into the fat-separator via pipe 55. If the ambient heat plus the heat supplied with the fat and oil are not sufficient to ensure an adequate temperature for the activity of the micro-organisms, a heating device can be envisaged in container chamber 9, e.g. in the form of a heating coil. Underneath motor 22 there is a box 34 with doors which houses a metering pump. In this box there is also a container for a nutrient which is metered to the micro-organisms. For this purpose a hose or a pipe 35 runs from this box 34 into the container and on to drum container 9, where the pipe opens out over drum 20. Mounted on the back of the installation (not visible here) there is a switch box which houses a programmable electric control device for motors 22,60, ventilator 36 and the metering pump. The installation is sealed shut at the top with a lid (not shown here) which rests on a rubber gasket. This prevents any unpleasant smells from escaping, because when ventilator 36 is not in operation, the one-way valve seals container 1, and when it is in operation, no air with smell-carriers can flow from the inside to the outside against the ventilator current. The lid of the installation can have hinges, in which case it is advantageously supported by pneumatic springs with catches at its free end with which it can be locked shut. This type of design means the installation can easily be opened for maintenance and then resealed odourtightly. An installation of this kind can be designed in line with this principle in a whole range of dimensions and with other technical solutions, too.

The metering device can, for example, be executed with a pump and the air supply can alternatively be assured by using air screens to blow micro-bubbles up into container chamber 9 in which the support material for the micro-organisms floats. In this case the rotating drum can be dispensed with. Several units can be connected and used in parallel as required to achieve the capacity needed to degrade the fat and oil.

The installation for separating and subsequently removing fats and oils in waste water also operates as a fat-separator itself in that gravity causes the separable fats and oils carried in with the waste water to float to the top of the water where they form a layer of fat and oil on the surface. The separated fat and oil is then metered to a microbiological module in the same way, where the fats and oils are degraded microbiologically. The installation can also be fitted with devices designed to accumulate particles which are difficult to separate to make them float to the top; furthermore, the waste water treated thus far can be forced to flow through special material with a particular affinity with fat and oil particles so as to absorb them.

The installation shown in FIG. 2 for the separation and subsequent removal of the separated fat will now be described. It consists of a square container 1. This can be made from chromium steel or plastic, with polypropylene being especially suitable because it resists fatty acids and is not affected by low pH-values either. Hence no long-term problems with corrosion are likely. The installation illustrated is sized for a kitchen with a capacity of about 400 meals per day. It is 1.30 m long, 0.70 m wide, 1.50 m high and holds about 900 liters of waste water. This size of installation is by far the one most often required and for a kitchen of this capacity, the installation is so compact that it can easily be transported down relatively narrow flights of stairs, as are often encountered in old buildings, and built into a cellar. The installation can of course be made correspondingly bigger for other kitchen capacities. The volume which the installation will need to be able to hold is determined using empirical values for conventional fat-separators and must ensure that, even if there is a sudden large surge of water, the average time the waste water remains in the installation is sufficiently long enough to allow the separable fats and oils to float to the top. Leading into container 1 there is an inlet pipe 2, through which the fat-polluted waste water flows into container 1. Inside the container there is a first partition 3 whose top edge 4 is fitted with a kind of comb 5. The whole of container chamber 7 in container 1 between side wall 6 and partition 3 is filled with waste water when the installation is operated. In this section 7, the separable fats and oils float to the top and form a layer on the surface of the water. When the installation is operated, this layer of oil and fat flows over edge 4 and through comb 5 so that primarily fats and oils arrive in the space on the other side of partition 3. Comb 5 holds back any floating solids. Waste water naturally flows over the top of partition 3 with the fats and oils. The volume flowing over the partition at any one moment coincides with the volume flowing in at the same moment through inlet pipe 2. In the container chamber 8 behind partition 3, any separable fats and oils still suspended in the waste water undergo further separation. In this container chamber 8, installed from above and sealed off from container chamber 8, there is a separate container chamber 9 with a partition 10 which contains a microbiological module in the form of a drum 20. The bottom of this container chamber 9 forms a channel 11 which slopes downwards towards the rear. At the rear of this channel 11, container 9 has an outlet 12. This runs into an overflow pipe 13, and, via this, back into container 8, with the aperture 14 of overflow pipe 13 being disposed a few centimeters above the level of the bottom edge of discharge pipe 15 of container 1. Underneath channel 11, container chamber 8 has a rearwardly sloping floor 16 with openings in the rear corners, or with a gap along its whole width between it and the side wall 17 of container 1. The space 18 underneath the sloping floor 16 is free here, and out of it discharge pipe 15 runs through partition 3 into container chamber 7, inside which it runs upwards and then to the outside at a level slightly below the level of inlet pipe 2. Container chamber 7 functions as a sludge trap and settling zone for any solids carried into the installation with the waste water. The sludge and solids that collect can be drained away from time to time via drainage pipes 19. If there is no slope available for the drainage operation, a pump is connected to drainage pipe 19. Through the length of container chambers 7 and 8 up to partition 10 of container 9 extends a drive shaft 21 which is made from stainless steel. It is driven by an electric motor 22 with angle gear 23. In the vicinity of container chamber 7, a paddle 24 is attached to this shaft 21. One or several such paddles, which rotate with shaft 21, continuously agitate the top layer of fat, oil and water in container chamber 7. Tests have shown that this is a very effective way of making fats and oils float to the top on the one hand, and solids and sludge sink to the bottom on the other hand. In the middle, an intermediate bearing 25 for shaft 21 is mounted on partition 3. In the vicinity of container chamber 8, that is to say, between partition 3 and partition 10 of container 9, a scoop pipe 26 is mounted on drive shaft 21, whose purpose will be explained below. At the end of shaft 21, a plastic toothed gear 27 is mounted on partition 10 on a reinforcing plate 40. This gear meshes with another gear 28 of the same size disposed underneath. This gear 28 is connected with a shaft 29 made of plastic, which forms the axle of a drum 20 housed in container chamber 9. This drum 20 has a drum disc 30,31 at both ends, and these drum discs are connected around their periphery with plastic tubes 32 or round plastic bars to form a cage-drum 20. The inside of this drum can be sub-divided into sections by other plastic rods. When the installation is operated, the drum is filled with carrier materials for micro-organisms, as will be described below, and drum 20 then alternately rotates these carrier materials with the colonized micro-organisms through the fat-polluted water which comes up to about the middle of drum shaft 29, and then through the air above this level. The power level of the motor for rotating the drum for this size of fat-separator for a kitchen with a capacity of 400 meals per day is 370 watts. Hence approx. 9 kWh of electric energy are required per day (24-hour operation). Built into side wall 6 there is a ventilator 36 with a one-way valve which allows air to be blown into the container because the micro-organisms used are aerobic and need a supply of air. The exhaust air is blown into the sewage system through a hole 33 in the top of discharge pipe 15 at its highest point, or outside through a special odour filter not shown here. If the ambient heat plus the heat supplied with the fat and oil are not sufficient to ensure an adequate temperature for the activity of the micro-organisms, a heating device can be envisaged for containers 7,8 and 9 in particular, e.g. in the form of a heating coil.

Underneath motor 22 there is a box 34 with doors which houses a metering pump. In this box there is also a container for a nutrient which is metered to the micro-organisms. For this purpose a hose or a pipe 35 runs from this box into the container and then on to drum container 9, where the pipe 35 opens out over drum 20. Mounted on the back of the installation (not visible here) there is a switch box which houses a programmable electric control device for the motor 22, the ventilator 36 and the metering pump. The way in which the control device works will be explained below. The installation is sealed shut at the top with a lid (not shown here) which rests on a rubber gasket. This prevents any unpleasant smells from escaping, because when ventilator 36 is not in operation, the one-way valve seals the container, and when it is in operation, no air with smell-carriers can flow from the inside to the outside against the ventilator current. The lid of the installation can have hinges, in which case it is advantageously supported by pneumatic springs with catches at the free end with which it can be sealed shut. This type of design means the installation can easily be opened for maintenance and then resealed odourtightly.

Figure 2:
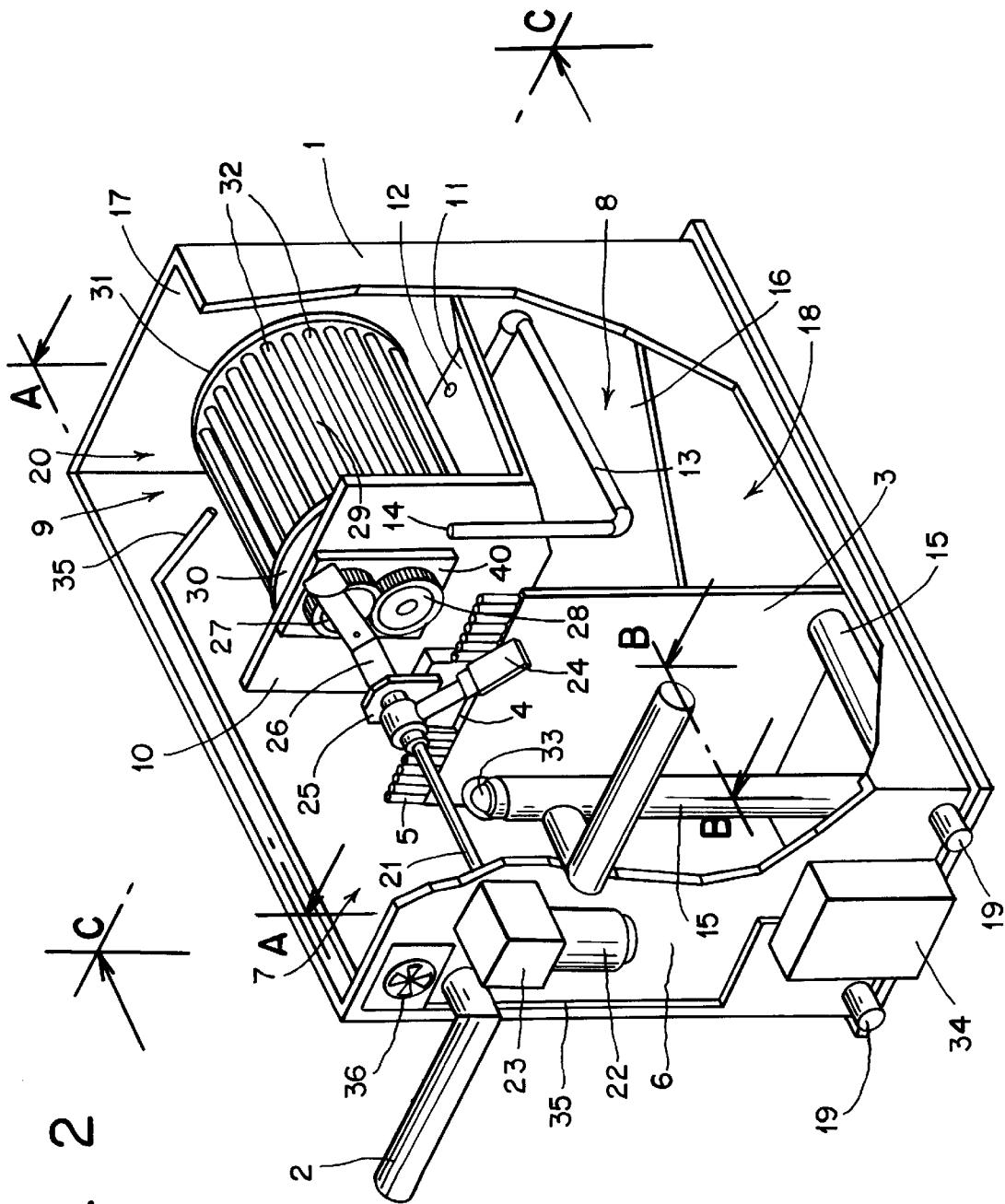
FIG. 2: a perspective view of a partial section of an installation for separating and subsequently removing fats and oils in waste water.
Figure 3:
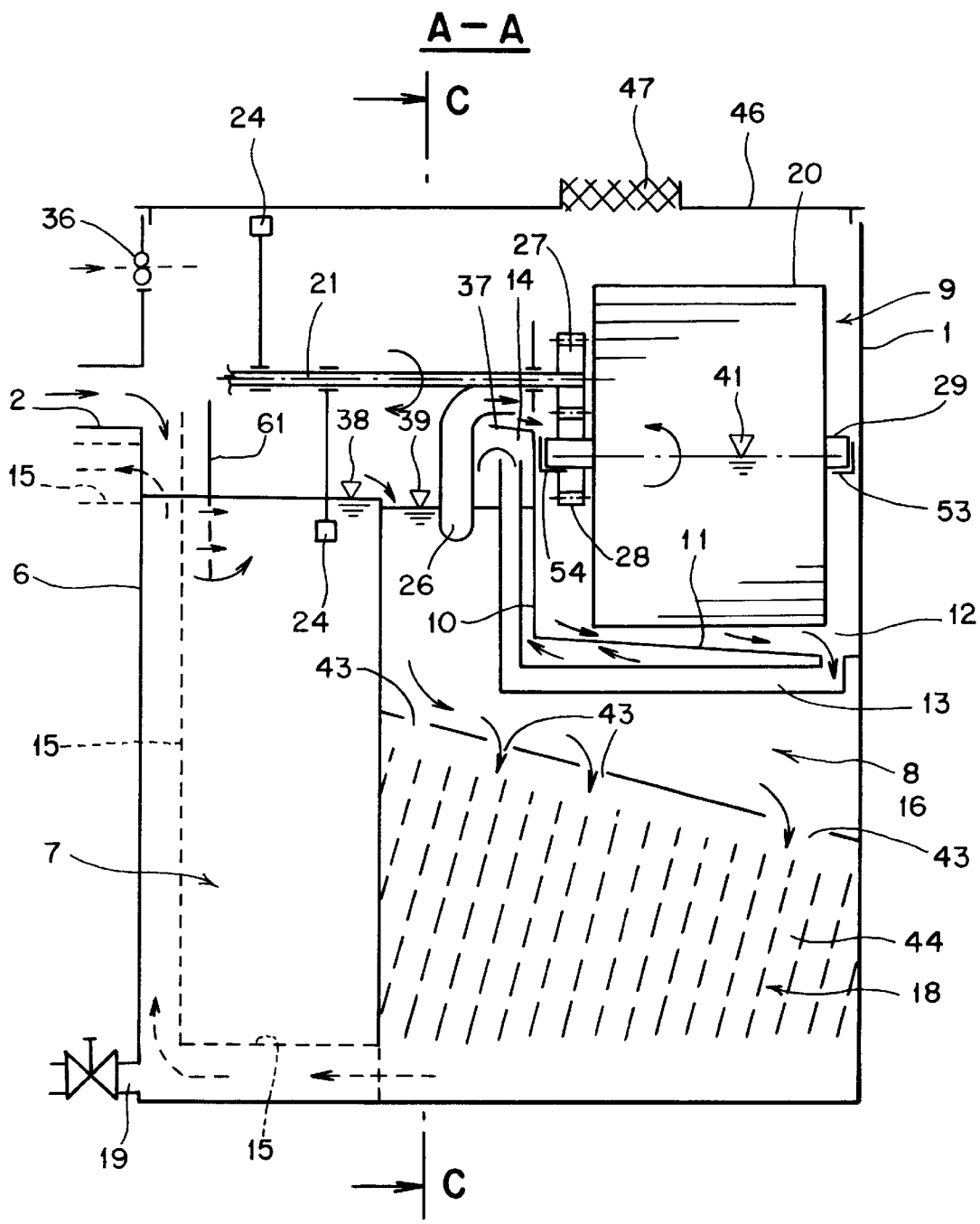
FIG. 3: a diagrammatic representation of the installation of FIG. 2 seen from the side, in a section along the plane A—A in FIG. 2.

FIG. 3 shows a section through the installation of FIG. 2, seen lengthwise on. The individual parts are represented diagrammatically and the Figure shows a section through the installation along the plane A—A in FIG. 2. The installation has a lid 46 which rests on a rubber gasket. An odour filter 47 is built into this lid. In the top left-hand corner of the Figure ventilator 36 is indicated, built into container wall 6. The ventilator blows air from below via a pipe (not shown here) into a cage, for example, in which there is a piece of Styropor cut to fit inside the cage. When the ventilator is operated, the Styropor piece is lifted and air can pass through the cage into the container. When the ventilator is not operated, the Styropor piece lies on top of the ventilator pipe aperture and seals it. The inlet pipe 2 is shown under ventilator 36. The fat and oil-polluted waste water flows through the inlet pipe 2 into the first container chamber 7, with a splashback wall 61 being disposed in front of the aperture of the inlet pipe. If there is a surge of inflowing waste water this wall prevents a wave from forming on the surface of the liquid in container chamber 7, which would cause an excessive volume of water to flow over edge 4 of partition 3 into the next container chamber 8. But the main purpose of the splashback wall 61 is to ensure that the solids and sludge in the newly inflowing water sink to the bottom of container chamber 7 so that only the top layer, consisting essentially of fat and oil and some water, flows over edge 4 into the next container chamber 8. In the vicinity of container chamber 7, drive shaft 21 carries two paddles 24 which continuously agitate the top layer of the liquid. The level of the liquid in container chamber 7 is indicated by a triangle 38 and is defined by the top edge 4 of partition 3. The fat and oil which has previously floated to the top flows over this edge 4 together with water into the next container chamber 8. Triangle 39 indicates the slightly lower level of liquid in this container chamber 8. In the vicinity of container chamber 8, drive shaft 21 carries scoop pipe 26, which is eccentrically attached to drive shaft 21. An inlet channel 37 runs through the top of partition 10 of drum container 9. When scoop pipe 26 rotates with shaft 21, it collects a portion of fat, oil and water in its inlet aperture, which is shown pointing towards the rear of the installation. When the scoop pipe 26 rotates out of the position shown towards the rear and then upwards, the liquid collected in pipe 26 flows towards its outlet aperture and is then, when scoop pipe 26 projects upwards on shaft 21, poured onto inlet channel 37, via which it flows into drum container 9. Drive shaft 21 drives drum 20 via gear 27 and gear 28 underneath, and keeps it rotating continuously. Here, in contrast to FIG. 2, gears 27,28 are disposed by way of a variant inside drum container chamber 9, instead of in front of partition 10. The drum shaft 29 is mounted on both sides on plastic bearings 53,54. Gear 27 can be displaced a little way towards these bearings along drive shaft 21 so that drum 20 can then easily be lifted out of bearings 53,54 and removed from drum container 9. The level of liquid in drum container 9 is indicated by triangle 41. It can be seen that the liquid comes up to about half way up shaft 29 carrying drum 20. This ensures that bearings 53,54 of drum shaft 29 are lubricated by the liquid. Drum container 9 has a floor which forms a sloping channel 11. From outlet 12 in channel 11, an overflow pipe 13 runs back under drum container 9 and then upwards to the axle height of drum shaft 29. This aperture 14 of overflow pipe 13 defines the liquid level 41 in drum container 9. Underneath drum container 9, a sloping floor 16 is built into container 1 with openings 43 in the form of holes or slots. Underneath floor 16 in this Figure, there are slats 44 which run upwards at an angle, which have a surface with an affinity for fat and oil. A plurality of slats are disposed adjacent to each other and extend across the entire inside width of container 1. From the zone occupied by these slats 44, which forms container chamber 18, a discharge pipe 15 runs through partition 3 and then upwards, where it runs to the outside through container wall 6. The bottom edge of discharge pipe 15, at the point where it runs through container wall 6, defines the liquid level 39 in container chamber 8. In the bottom left-hand corner of container 1, there is a drainage pipe 19 with a tap for the sludge and solids that collect in container chamber 7.

FIG. 4 shows a diagrammatic representation of the installation in a section along the plane C—C in FIG. 2. This diagram helps to illustrate how scoop pipe 26 functions. Scoop pipe 26 is mounted eccentrically on drive shaft 21. The inlet aperture 45 of scoop pipe 26 describes the circle indicated. The circle shown slightly below indicates the periphery of drum 20. The outlet aperture 48 of scoop pipe 26 is directed towards the back of the installation in the direction of drive axle 21. Underneath outlet aperture 48 of scoop pipe 26 can be seen inlet channel 37, which runs through opening 49 into drum container 9. Drive axle 21 can rotate in both directions. If it rotates clockwise in the Figure shown, then scoop pipe 26 with its inlet aperture 45 is immersed in the separated, floating oil and fat in container chamber 8 and collects a portion thereof, with this portion also possibly containing some water. Triangle 39 indicates the level of liquid in container chamber 8. If scoop pipe 26 now continues to rotate clockwise, the collected portion in pipe 26 flows towards its outlet aperture 48 to end up being poured out onto inlet channel 37, via which the fat, oil and water flow through opening 49 into drum container 9. Drive shaft 21 drives drum 20 simultaneously, and keeps it rotating. Because the drum is driven by the two toothed gears (not shown here), it rotates in the opposite direction to drive shaft 21. If, however, drive shaft 21 now rotates anti-clockwise in the illustration shown, scoop pipe 26 collects nothing and drum 20 rotates clockwise. By switching the direction of rotation from time to time, portions of fat and oil can very easily be conveyed into container chamber 9 with constantly rotating drum 20. To the right of the Figure one can see the overflow pipe 13, whose aperture 14 defines the level 41 in drum container 9. Underneath drum 20, the rearwardly and downwardly sloping channel 11 is drawn in, which forms the floor of drum container 9. At the lowest point there is an outlet 12, which runs into overflow pipe 13. The installation has a lid 46, which rests on a rubber gasket, into which an odour filter 47 is built.

FIG. 5 is a partial section along the plane B—B in FIG. 2. The Figure shows the level 38 in container chamber 7, which is slightly higher than level 39 in adjoining container chamber 8, from which fat and oil is collected. Inserted in the vertical section of discharge pipe 15 there is a snugly fitting pipe 50 with bottom 51 which is porous at the top and bottom, it being perforated as illustrated, for example. At the top of pipe 50 there is a handle 52. Its inside is filled with special material 42 with the capacity to accumulate, that is to say, absorb, fat. A suitable filler material is, for example, the product MELT-BLOWN, a textile composite material made from polypropylene in granular form or as a tape, manufactured by ECOTEXTIL, 277 Hornátky un Neratovic, Czech Republic. One gram of this material can accumulate approx. 12 to 18 grams of fat. As liquid flows through pipe 50, any not yet separated or inseparable fat and oil particles are largely captured and retained by this material. When the material capacity is exhausted, pipe 50 can be removed by pulling on handle 52. The material is then removed and replaced. The oil and fat-bearing material is recycled, i.e. it is pressed out or centrifuged. Solvents for extracting fats and oils can also be used. The fat and oil from the recycling process can be returned to container chamber 8 of the installation.

Figure 6:
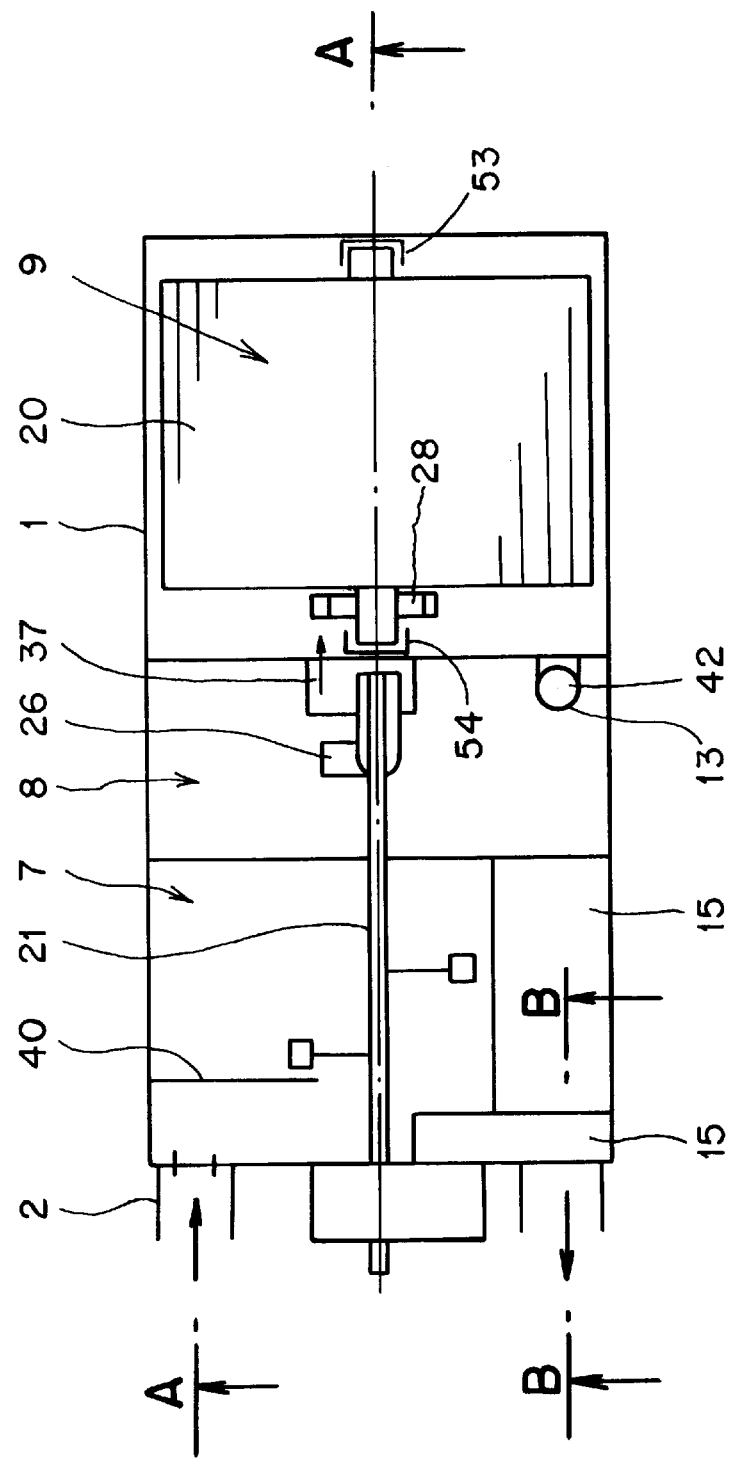
FIG. 6: a perspective view of the installation of FIG. 2, seen from the top.

FIG. 6 shows the installation seen from the top. All the parts designated by numerals have already been described in connection with the other Figures. In contrast with FIG. 2, the discharge pipe 15 is shown here as a square discharge channel.

The installation of FIGS. 2 to 6 not only separates fats, it also removes the separated fat and oil by means of the microbiological module which will now be described and explained in more detail. The module consists of the drum container 9, which is functionally separate from the actual fat-separator, and the drum 20, which rotates in this container. This drum 20 is filled with carrier material for special fat and oil-degrading micro-organisms. These aerobic micro-organisms colonize the carrier material and as the drum 20 rotates, they are repeatedly immersed in the liquid in which the drum 20 rotates, where they pick up oil and fat and then emerge from the liquid and are transported through the air, which supplies them with oxygen. Throughout this process they degrade the fats and oils. With regard to the technology of the installation it is very important that this degradation process proceeds under conditions that are always approximately the same, i.e. within a certain range in respect of the temperature and the pH-value of the liquid medium in drum container 9. With this in mind, it is important that the volume of fat and oil metered in per unit of time is kept within a certain range, or, ideally, is kept constant. That is the essential factor for ensuring successful microbiological degradation in an installation of this type. These peripheral conditions can be guaranteed by ensuring that the micro-organisms in said drum are allowed to act in a container which is separate from the actual fat-separator, in which the required conditions can be maintained continuously over time. This microbiological module essentially only receives the fat and oil to be degraded, even though a little water may also happen to be carried in as well. The water resulting from the degradation process has a low pH-value and is conveyed through overflow pipe 13 into container chamber 8 of the fat-separator, where it mixes with the large volume of water in there so that its low pH-value has practically no effect on the pH-value in container chamber 8 after it is mixed in. Separating drum container 9 from the other parts of the installation also forms a buffer against temperature fluctuations. If a surge of hot water flows into the installation from a dishwasher, this has virtually no impact on the temperature in drum container 9. Neither is the quantity of fat and oil that is fed in affected. The electric control device is used to ensure that drum 20 rotates continuously, thereby ensuring that paddles 24 and scoop pipe 26 also turn continuously. Most of the time, however, scoop pipe 26 does not collect anything. By means of a timer switch the electric control device is set or programmed to stop the motor every hour, for example, and then rotate it a few times in the opposite direction. During this process scoop pipe 26 scoops a few portions into drum container 9. How often the direction of rotation is reversed and how many times the scoop pipe 26 is made to scoop each time this happens is adapted from case to case in line with the operating conditions of each kitchen, and programmed with the electric control device. It is exactly the same for ventilator 36. The ventilator need not run continuously, but can instead occasionally be switched on for a certain period by a control program depending on the required activity of the micro-organisms. The same also applies to the metering pump for supplying additional nutrient solution for the micro-organisms in drum 20.

The specific microbiological aspects of this fat and oil degradation will be disclosed below: there are a considerable number of micro-organisms which produce enzymes that hydrolyse the ester bonds of triacylglycerols, i.e. oils and fats. These enzymes are referred to as lipases (triacylglycerol of acylhydrolase, EC 3.1.1.3). In the food and chemical industries, lipases are commonly used in a pure form (decapsulated or immobilized) to hydrolyse triacylglycerols. Those micro-organisms which are the most important lipase producers include lipolytic yeasts, which are often exploited in biotechnological contexts. Their lipolytic enzymes are species-specific. They can be induced by various triacylglycerols or oleic acid. With lipolytic yeasts, the lipase synthesis can often be positively influenced by the source of oxygen selected and by the presence of citrate. Citric acid and, in some cases, isocitric acid as well, are the main metabolic products resulting from the exploitation of hydrocarbons, oils and fats as a nutrient for these micro-organisms. The accumulation of these metabolic products in the culture medium causes rapid acidification. A particularly suitable micro-organism for this installation for removing organic oils and fats is the lipolytic yeast *Yarrowia lipolytica,* with the strain *Yarrowia lipolytica* W1 being particularly suitable. The morphological and physiological properties of this yeast strain *Yarrowia lipolytica* W1 will be described and explained below. The yeast strain *Yarrowia lipolytica* W1 does not ferment maltose, saccharose, lactose, glucose, galactose or raffinose. It does not assimilate any nitrates, but it does assimilate L-lysine and erythritol. It grows at a temperature between 5° C. and 35° C. In a liquid culture medium with oleic acid as the only source of carbon, it forms elliptical to oval cells. After 120 to 142 hours of cultivation, it forms pseudomycelium and real mycelium. No pigmentation occurs. It requires neither the presence of vitamins, nor any kind of growth stimulators to grow in a synthetic medium. This strain is sensitive to nystatin. It is not very sensitive, however, to changes in the pH of the medium, or to changes in the ionic force of the medium. If exposed to extreme temperatures for a short period, or if there is a temporary oxygen deficit in the medium, it survives very well. It has a very good capacity for adhering to the surface of the fat particles. It produces the emulsification substance that enlarges the surface of the degraded oils and fats for colonization with yeast. It is very good at colonizing synthetic carriers with suitably electrically charged surfaces and a jointed or non-jointed surface structure. This yeast *Yarrowia lipolytica,* in particular the strain known as *Yarrowia lipolytica* W1 (Harrison) van der Walt et. von Arx is the amorphous form of *Candida lipolytica* (Harrison), Diddens et. Lodder. This micro-organism was isolated from soil contaminated with petroleum near a source of petroleum in Hodonín in the Czech Republic, and deposited on Apr. 16, 1996 at the Czech Collection of Micro-organisms under number CCM 4510, and a Viability Statement was issued under the same number. The address of this internationally recognized depositary under the Budapest Agreement is: CCM—Czech Collection of Microorganisms, Masaryk University, Tvrdého 14, CR-602 00 Brno. A copy of the Receipt in the case of an Original Deposit and a copy of the Viability Statement are enclosed as Appendix 1 and Appendix 2 of the description.

The high resistance of *Yarrowia lipolytica* W1 to the action of external factors, the low requirement for nutrients in the surrounding environment, its excellent viability and high lipolytic activity make it possible to exploit this micro-organism for the biodegradation of fats and oils in closed containers and for the continuous biodegradation of oils, fats and oil emulsions in the process of cleaning waste water contaminated in this way. The yeast strain is first propagated and induced in a synthetic or organic medium in the presence of fatty acids or oils. Synthetic carriers for the micro-organisms are then colonized with the yeast, or the micro-organisms are used directly in the contaminated waste water. The degradation of the oils and fats proceeds with a supply of air and a sufficient concentration of nitrogen, with the ratio between the carbon contained in the oil or fat in this medium, and the nitrogen, should be kept within the limits of 60 to 100:1. The optimum conditions for carrying out the process for biodegrading oils and fats using this yeast are with a pH-value of the medium between 2.0 and 5.0 at a temperature of 20° C. to 35° C. For the purpose of preparing and inducing *Yarrowia lipolytica* W1 it is best to use the organic or synthetic culture medium, which forms a source of nitrogen and phosphorus, in a soluble form, to which are added other inorganic salts and trace elements plus oleic acid or vegetable oil. The initial pH-value of the culture medium can advantageously be adjusted with citric acid to between 3.5 and 4.5. With an intensive through-flow of air, i.e. 0.3 to 1.0 liter of air per 1 liter of medium per hour at a temperature of 25° C. to 30° C., the cultivation time is between 24 and 72 hours.

The end products of the biodegradation of the oils and fats are carbon dioxide ($CO_2$), biomass and citric acid as the major metabolite. Other organic acids such as acetic acid, malic acid, fumaric acid and oxoglutaric acid may also occur. During the continuous biodegradation of the fat by the cells, however, these metabolites may also be converted into citric acid or used to form biomass. The primary advantage of this process for the biodegradation of fats and oils is that the resultant metabolites are not toxic and can easily be broken down by the usual microflora in biological waste water purification plants. Because the micro-organism used was isolated from the natural environment and has not been genetically modified, and because it belongs to the species of non-pathogenic yeasts widely used in the food industry, too, (production of the citric acid, preparation of nutrient proteases and lipases etc.), there is no danger of any negative impact on the environment or on human health.

Tapes or fluffy cord made from synthetic fibre, preferably polyester, which can be colonized with the cells induced by *Yarrowia lipolytica* W1 are suitable as carrier material. These tapes or cords are wound in sections of about 1.50 m on small plastic tubes made from synthetic polymers, which are about 10 cm long with a diameter of 3 cm to 4 cm, for example. The tubes are made from polyvinylchloride, polyethylene or polypropylene, for example. The drum 20 of the installation, which can be sub-divided into several sections, is filled with tubes wound like this. This carrier material is then colonized with the cells induced by *Yarrowia lipolyptica* W1, whereupon the installation is ready to operate and the fat and oil can be fed in continuously or periodically. During practical tests with the installation, the medium in drum container 9 received $NH_4^+$ as a source of nitrogen at a concentration of 100 mg/l to 400 mg/l. The pH-value in the medium settled to between 1.02 and 3.0 within 35 weeks. The temperature of the medium fluctuated between 25° C. and 28° C. The water discharged from the installation contained oil in a concentration of 38.25 mg/l to 48.12 mg/l (gravimetric analysis after extraction into organic solvent).

Representatives of the species *Yarrowia lipolytica*, in particular the strain *Yarrowia lipolytica* W1, demonstrate good lipolytic activity in the presence of oils and fats, similar to when emulsions of these substances are present in the water medium. The biodegradation rate of these pollutants of the water medium by the cells of the strain *Yarrowia lipolyptica* W1 is relatively high when the pH-value is somewhere between the broad range of 0.8 and 7.0, and at temperatures from 5° C. to 35° C. The prerequisites for achieving optimum physiological activity of *Yarrowia lipolyptica* W1 are: firstly, an adequate supply of oxygen, i.e. between 0.3 and 1.0 liter of air per 1 liter of waste water per hour; secondly, an adequate concentration of $NH_4^+$, i.e. at least 60 mg/l, and, thirdly, a concentration of 0.1% to 3% (w/v) of fat or oil in the medium. The waste water discharged from the installation is only very slightly acidified by the citric acid. Treating it in community waste water purification plants poses no problem whatsoever.

We claim:

1. An installation for removing fat and oil, comprising:

a treatment container chamber for receiving a liquid medium, discharging out of said treatment container chamber via a bottom outlet, and having an overflow pipe which runs upwards and opens outwardly outside of said treatment container chamber as a discharge pipe, so that its inside bottom edge, at the point where it opens outwardly, defines a level of a medium in said treatment container chamber;

a support carrier material in the form of a plurality of plastic tubes wound with lengths of polyester cord colonized with a fat and oil-degrading yeast microorganism *Yarrowia lipolytica* W1 in said treatment container chamber, said microorganism *Yarrowia lipolytica* W1 being deposited with international depository CCM 4510 of Apr. 16, 1996 at the CCM Czech Collection of Microorganisms, according to the Budapest Treaty;

a nutrient solution container with a metering pump for feeding $NH_{4+}$ into said treatment container chamber, as required, as a source of nitrogen for said fat and oil-degrading microorganism;

means for supplying said microorganism with air; and, a metering device having a programmable control device, for metering previously separated fat and oil from either a waste water container chamber arranged outside said treatment container chamber, or from a fat-separator, to said treatment container chamber.

2. The installation for removing fat and oil according to claim 1, further comprising an outer container with an inlet pipe and a discharge pipe for the separation and subsequent removal of fats and oils from the waste water, said outer container having at least one waste water container chamber for separating fats and oils from inflowing waste water, and a separate treatment container chamber containing a carrier material colonized with said fat and oil-degrading microorganism.

3. The installation for removing fat and oil according to claim 2, wherein said treatment container chamber contains therein a rotatably mounted drum housing, said carrier material colonized with said fat and oil-degrading microorganism, said drum being driven by electrical means, and wherein said metering device comprises a scoop pipe rotatable around an axle, so that with each revolution of said scoop pipe, a definite portion of oil, fat and water is pourable onto an inlet channel leading into the treatment container chamber.

4. The installation for removing fat and oil according to claim 2, wherein following immediately from said inlet pipe, for separating oils and fats, said outer container has, at least, one settle container chamber in which sludge and solids are able to settle, followed by an additional separation container chamber, separated by a first partition wall, and being at a lower level for the separation of fat and oil from the waste water, from said settle container chamber, separated oil and fat being conveyable with said metering device into said treatment container chamber, which is separated from said separation container chamber by a second partition wall and a channelled bottom, and in which said treatment container chamber there is carrier material colonized with fat and oil-degrading microorganisms, and from the bottom of said treatment container chamber an overflow pipe opens outwardly in said separation container chamber above a predetermined level in said separation container chamber.

5. The installation for removing fat and oil according to claim 4, wherein underneath said separation container chamber, and separated from the latter by a sloping, pervious floor, there is a series of slats in a separate container flowing chamber disposed closely together and slopingly with oil-attracting surfaces, through which waste water is forced to flow before it enters said discharge pipe, and in that said discharge pipe runs through a flow container, the inside of which is filled with a material with the capacity to absorb fat, after which said discharge pipe runs out of said outer container.

6. The installation for removing fat and oil according to claim 5, wherein said flow container is a pipe with a sealed bottom which is pervious at both ends and introduced through an opening so that it fits snugly in a rising section of said discharge pipe.

7. The installation for removing oil and fat according to claim 1, further comprising at least one of: (1) a ventilator having a one-way valve, with which air is able to be blown into said treatment container chamber, or (2) an oxygen or air-supplying device with which fine micro-bubbles of air or oxygen are able to be pumped into said treatment container chamber; and in that for the purpose of removing exhaust air, said treatment container includes an odor filter or the installation has an opening in its discharge pipe; and wherein the metering device comprises a nutrient solution container with a metering pump for feeding nutrient solution into said treatment container chamber as required for said fat and oil-degrading micro-organism; and wherein the installation also comprises a programmable electric control device which regulates quantities of fat and oil, air or oxygen and $NH_4^+$ metered into said treatment container chamber.

8. The installation for removing oil and fat according to claim 1, wherein said metering device comprises a pipe with an Archimedes screw drivable by a motor, and in that from the metering device pipe, a further pipe branches off into said treatment container chamber and opens outwardly there, and in that an overflow pipe runs out of said treatment container chamber and defines a level in said treatment container chamber at its highest point.

9. The installation for removing oil and fat according to claim 1, further comprising a lid atop said installation for sealing gases and odors within said installation, said lid resting on a rubber gasket with said lid being pivotable on hinges and supported by means of pneumatic springs.

* * * * *